Sept. 18, 1945.  J. A. MILLER  2,385,321
INSPECTION TABLE
Filed July 13, 1944  2 Sheets-Sheet 1

Inventor:
JOHN A. MILLER,
by John E. Jackson
his Attorney.

Inventor:
JOHN A. MILLER,
by John E. Jackson
his Attorney.

Patented Sept. 18, 1945

2,385,321

UNITED STATES PATENT OFFICE 2,385,321

INSPECTION TABLE

John A. Miller, Pittsburgh, Pa., assignor to National Tube Company, a corporation of New Jersey Application July 13, 1944, Serial No. 544,801

8 Claims. (Cl. 214—1)

This invention relates to inspection tables and more particularly to inspection tables for tubular articles.

The conventional manner of inspecting pipe, tubular products and the like, is to place them upon an inspection table composed of spaced rails, whereon the inspector rolls the product back and forth, thereby being able to closely examine and inspect the external surfaces of such product and make the necessary gagings and measurements. This inspection enables the operator to discover, locate, mark and note the defects and imperfections on the product and to properly separate the accepted and rejected pieces. The inspection table is usually divided into three parts—one part containing the uninspected product and known as the ingoing table, one part reserved for actual inspection known as the inspection station and the balance reserved for collecting and disposing of inspected product, known as the outgoing table. When the product is comparatively large in diameter, say 18" outside diameter, it requires a minimum of five feet to rotate a pipe one turn upon the inspection table and is evident that it requires a great deal of walking back and forth by the inspector to inspect the entire circumference of a large pipe along the whole length thereof. Also there is a great deal of physical effort involved in rolling the pipe back and forth.

It is accordingly an object of the present invention to provide pipe inspection apparatus which requires a minimum of floor space.

It is another object of the present invention to provide a table which permits pipe to be inspected with a minimum of effort and walking by the inspector.

It is a further object of this invention to provide means for inspecting pipe or tubular products in an expeditious manner.

The foregoing and further objects will be apparent from the specification and drawings wherein.

Figure 1:
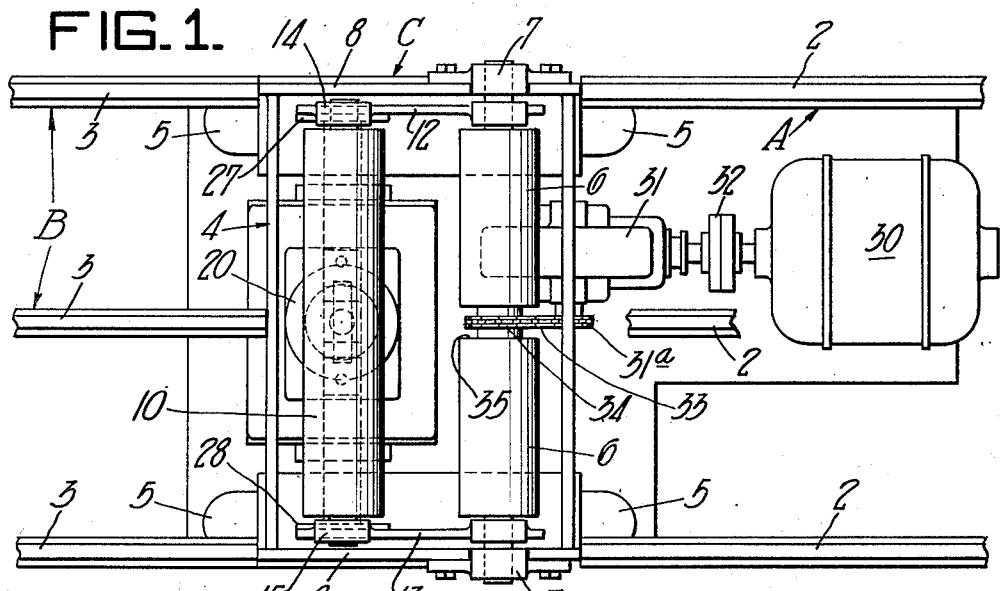
Figure 1 is a plan view of the apparatus of my invention.
Figure 2:
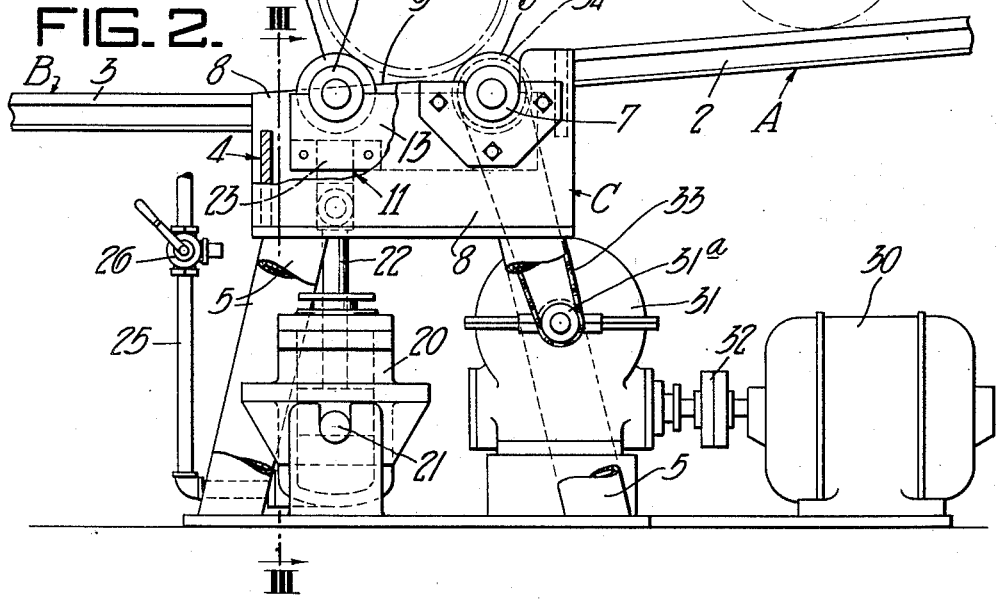
Figure 2 is a side view thereof.
Figure 3:
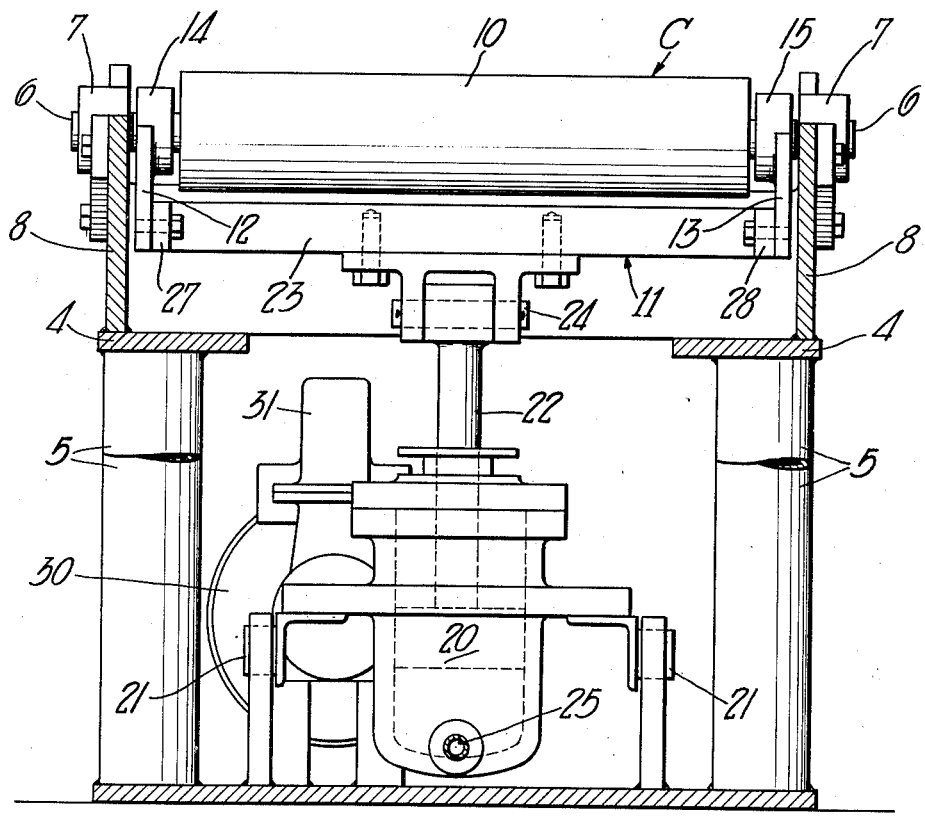
Figure 3 is an end view taken on line III—III of Figure 2.

Referring more particularly to the drawings, the letter A designates an ingoing table composed of rails 2 for delivering pipe to inspection stations C, and the letter B indicates an outgoing table composed of rails 3 for removing inspected pipe therefrom.

The inspection station C comprises a framework 4 mounted on legs 5 and carries a roll 6 journaled in fixed bearings 7 at opposite sides of the framework 4. The oppositely disposed sides 8 of the framework 4 are inclined downwardly as at 9 from the bearings 7 for a purpose that will be described more fully hereinafter.

A roll 10 is disposed with its axis parallel to that of the roll 6 and is carried by a yoke 11 having arms 12 and 13 having bearings 14 and 15 at the outer end thereof in which the roll 10 is journaled and has bearings at the opposite ends thereof mounted on the necks of the roll 6.

Disposed beneath the roll 10 is a pneumatic or hydraulic cylinder and piston 20 which is pivotally mounted on trunnions 21 and carries an upwardly reciprocable piston rod 22. The lower end of cylinder 20 is connected to a suitable source of fluid under pressure by pipe 25 through suitable 3-way valve 26.

A bar 23 is pivotally connected to the upper end of the piston rod 22 as at 24 and has flanges 27 and 28 at its ends to which are attached the arms 12 and 13 at a point adjacent the bearings 14 and 15. Thus, it is seen that the roll 10 is adapted to be raised and lowered by the cylinder and piston 20 and is pivotally connected to the roll 6 by arms 12 and 13. The spacing between the rolls 6 and 10 can be adjusted to fit various sizes of pipe by providing a number of pairs of arms 12 and 13 of different lengths and changing them as desired.

A motor 30 is disposed beneath the incoming table A and is connected to a gear reduction unit or speed reducer 31 by a coupling 32. The speed reducer 31 carrying a sprocket wheel 31ª is operatively connected to the roll 6 by a chain 33 which engages a sprocket wheel 34 disposed in a groove 35 intermediate the ends thereof.

In operation, a crane-lift of pipe is disposed on the incoming table A. Fluid under pressure is admitted to the cylinder 20 by 3-way valve 26 to elevate the roll 10. A pipe X is then permitted to roll down the table A and is received between the rolls 6 and 10. Roll 6 is then revolved by motor 30 through coupling 32 and speed reducer 31 connected to the roll by chain 33 which engages the sprocket wheels 34 and 31ª. The inspector can thereupon inspect the whole circumference of the pipe by walking along the rearward or discharge side of the inspection unit C. In case the inspector wishes to more carefully inspect a portion of the pipe, the valve 26 can be operated to lower the pipe X onto the end members 8 which will prevent rotation thereof. After the pipe X has been inspected and any defects marked, the inspector turns the 3-way valve to disconnect the cylinder 20 from the source of fluid pressure and to exhaust the fluid therefrom. This lowers the roll 10 so that it is entirely below the level of the inclined sides 8 of the framework 4 which permits the pipe X to roll theredown and onto the outgoing table B.

While I have shown and described one specific embodiment of my invention, it will be understood that this embodiment is merely for the purpose of illustration and description and that various other forms may be devised within the scope of my invention, as defined in the appended claims.

I claim:

1. Pipe inspection apparatus comprising a pair of end members having inclined upper surfaces, a pair of spaced parallel rolls disposed between said members and transversely thereof, one of said rolls having a portion thereof disposed above said inclined surfaces, the other of said rolls being adjustably mounted in a vertical plane, and means for elevating said roll to raise a portion thereof above said inclined surfaces to provide a pipe receiving trough between said rolls and to lower it to permit pipe to roll therefrom on said inclined surfaces.

2. Pipe inspection apparatus comprising a pair of end members having inclined upper surfaces, a pair of spaced parallel rolls disposed between said members and transversely thereof, one of said rolls having a portion thereof disposed above said inclined surfaces, the other of said rolls being adjustably mounted in a vertical plane, means for elevating said roll to raise a portion thereof above said inclined surfaces to provide a pipe receiving trough between said rolls and to lower it to permit pipe to roll therefrom on said inclined surfaces, and means for rotating at least one of said rolls.

3. Pipe inspection apparatus having delivery and withdrawal means and an inspection station therebetween, said delivery and withdrawal means comprising spaced inclined rails, said inspection station comprising a pair of spaced members having inclined upper surfaces, a pair of spaced parallel rolls disposed between said members and transversely thereof, said inclined surfaces and said rolls being disposed adjacent the lower end of and below the level of said delivery means, one of said rolls having a portion thereof disposed above said inclined surfaces, the other of said rolls being adjustably mounted in a vertical plane, and means for elevating said roll to raise a portion thereof above said inclined surfaces to provide a pipe receiving trough between said rolls and to lower it to permit the pipe to roll therefrom on said inclined surfaces and onto said withdrawal means.

4. Pipe inspection apparatus having delivery and withdrawal means and an inspection station therebetween, said delivery and withdrawal means comprising spaced inclined rails, said inspection station comprising a pair of spaced members having inclined upper surfaces, a pair of spaced parallel rolls disposed between said members and transversely thereof, said inclined surfaces and said rolls being disposed adjacent the lower end of and below the level of said delivery means, one of said rolls having a portion thereof disposed above said inclined surfaces, the other of said rolls being adjustably mounted in a vertical plane, means for elevating said roll to raise a portion thereof above said inclined surfaces to provide a pipe receiving trough between said rolls and to lower it to permit the pipe to roll therefrom on said inclined surfaces and onto said withdrawal means, and means for rotating at least one of said rolls.

5. Pipe inspection apparatus having delivery and withdrawal means and an inspection station therebetween, said delivery and withdrawal means comprising spaced inclined rails, said inspection station comprising a pair of spaced members having inclined upper surfaces, the upper end of said members being adjacent to but below the level of the lower end of said delivery means and the lower ends thereof being adjacent to and above the level of the upper end of said withdrawal means, a roll mounted on said end members and transversely thereof at the upper end thereof and adjacent the lower end and below the level of said delivery means, a pair of arms pivotally connected to said roll, a roll mounted on said arms, a pivotally mounted cylinder, and a piston in said cylinder connected to said arms.

6. Pipe inspection apparatus having delivery and withdrawal means and an inspection station therebetween, said delivery and withdrawal means comprising spaced inclined rails, said inspection station comprising a pair of spaced members having inclined upper surfaces, the upper end of said members being adjacent to but below the level of the lower end of said delivery means and the lower ends thereof being adjacent to and above the level of the upper end of said withdrawal means, a roll mounted on said end members and transversely thereof at the upper end thereof and adjacent the lower end and below the level of said delivery means, a pair of arms pivotally connected to said roll, a roll mounted on said arms, a pivotally mounted cylinder, a piston in said cylinder connected to said arms, and means for driving at least one of said rolls.

7. Pipe inspection apparatus having delivery and withdrawal means and an inspection station therebetween, said inspection station comprising a pair of spaced end members having inclined upper surfaces, the upper end of said members being adjacent to said delivery means and adapted to receive pipe therefrom and the lower ends being adjacent to said withdrawal means and adapted to deliver pipe thereto, a roll mounted between said end members and transversely thereof adjacent the upper end thereof and below the level of said delivery means, a pair of arms pivotally connected to said roll adjacent the ends thereof, a roll carried by said arms, a pivotally mounted cylinder, a piston in said cylinder connected to said arms and means for driving at least one of said rolls.

8. Pipe inspection apparatus comprising a pair of spaced members having pipe receiving upper surfaces, a pair of spaced parallel rolls disposed between said members and transversely thereof, one of said rolls having a portion thereof disposed above said pipe receiving surfaces, the other of said rolls being adjustably mounted in a vertical plane and means for elevating said roll to raise a portion thereof above said pipe receiving surfaces to provide a pipe receiving trough between said rolls and to lower it to deposit a pipe in said trough onto said pipe receiving surfaces.

JOHN A. MILLER.